US011040480B2

(12) United States Patent
Kwak et al.

(10) Patent No.: US 11,040,480 B2
(45) Date of Patent: *Jun. 22, 2021

(54) OPTICAL FILM WITH HIGH SLIP PROPERTY AND EXCELLENT PROPERTY OF BLOCKING UV LIGHT, AND POLARIZING PLATE COMPRISING THE SAME

(71) Applicant: LG CHEM, LTD., Seoul (KR)

(72) Inventors: Sang Min Kwak, Daejeon (KR); Seong Wook Kang, Daejeon (KR); Dong Wan Kim, Daejeon (KR); Kil An Jung, Daejeon (KR); Ki Joong Lee, Daejeon (KR); Min Su Park, Daejeon (KR); Jong Sung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 252 days.

This patent is subject to a terminal disclaimer.

(21) Appl. No.: 16/072,089

(22) PCT Filed: Sep. 19, 2017

(86) PCT No.: PCT/KR2017/010256
§ 371 (c)(1),
(2) Date: Jul. 23, 2018

(87) PCT Pub. No.: WO2018/056673
PCT Pub. Date: Mar. 29, 2018

(65) Prior Publication Data
US 2019/0039281 A1 Feb. 7, 2019

(30) Foreign Application Priority Data

Sep. 20, 2016 (KR) .................. 10-2016-0120101
Sep. 18, 2017 (KR) .................. 10-2017-0119827

(51) Int. Cl.
| | | |
|---|---|---|
| G02B 1/04 | (2006.01) | |
| B29C 55/12 | (2006.01) | |
| G02B 5/28 | (2006.01) | |
| C08J 5/18 | (2006.01) | |
| G02B 1/14 | (2015.01) | |
| G02B 5/30 | (2006.01) | |

(52) U.S. Cl.
CPC .............. *B29C 55/12* (2013.01); *C08J 5/18* (2013.01); *G02B 1/04* (2013.01); *G02B 1/14* (2015.01); *G02B 5/28* (2013.01); *B32B 2307/518* (2013.01); *C08J 2333/12* (2013.01); *C08J 2433/00* (2013.01); *C08J 2469/00* (2013.01); *G02B 5/3033* (2013.01)

(58) Field of Classification Search
CPC .................................................... B29C 55/12
See application file for complete search history.

(56) References Cited

U.S. PATENT DOCUMENTS

| | | | | |
|---|---|---|---|---|
| 6,485,810 B1 * | 11/2002 | Uchida | .................. | B29C 55/12 |
| | | | | 428/141 |
| 6,671,031 B1 | 12/2003 | Nishimura | | |
| 2003/0180528 A1 | 9/2003 | Flosenzier et al. | | |
| 2007/0243371 A1 * | 10/2007 | Yokota | ..................... | B32B 27/20 |
| | | | | 428/335 |
| 2008/0311352 A1 | 12/2008 | Hsu et al. | | |
| 2010/0134879 A1 * | 6/2010 | Yoshihara | ............... | B32B 27/30 |
| | | | | 359/361 |
| 2015/0183945 A1 | 7/2015 | Shiraishi et al. | | |
| 2016/0096937 A1 * | 4/2016 | Takahashi | ............... | C08L 69/00 |
| | | | | 525/185 |
| 2018/0299588 A1 | 10/2018 | Kwak et al. | | |
| 2018/0356577 A1 | 12/2018 | Kwak et al. | | |
| 2019/0033495 A1 | 1/2019 | Kwak et al. | | |

FOREIGN PATENT DOCUMENTS

| | | |
|---|---|---|
| CN | 1339116 | 3/2002 |
| CN | 102207572 A | 10/2011 |
| CN | 102262316 | 11/2011 |
| EP | 1158314 A1 | 11/2001 |
| JP | 01235904 A | 9/1989 |
| JP | 2003-305787 A | 10/2003 |
| JP | 2004306516 A | 11/2004 |
| JP | 2007-086730 A | 4/2007 |
| JP | 2009-294359 A | 12/2009 |
| JP | 2010-264750 A | 11/2010 |
| JP | 2011215171 A | 10/2011 |
| JP | 2011-248178 | 12/2011 |
| JP | 2012032768 A | 2/2012 |
| JP | 4915114 B2 | 4/2012 |
| JP | 5369820 B2 | 12/2013 |
| JP | 5640417 | 12/2014 |
| JP | 2015-143842 A | 8/2015 |
| JP | 5763367 B2 | 8/2015 |
| JP | 2015-165301 A | 9/2015 |
| JP | 5888864 B2 | 3/2016 |
| JP | 2018-535452 A | 11/2018 |
| JP | 2018-0356577 A1 | 3/2019 |
| JP | 2019-0033495 A1 | 4/2019 |
| KR | 10-0673696 A | 1/2007 |
| KR | 10-2007-0023545 A | 2/2007 |
| KR | 10-2010-0102290 A | 9/2010 |
| KR | 1020110110011 A | 10/2011 |
| KR | 10-1174948 B1 | 8/2012 |
| KR | 10-2013-0108082 A | 10/2013 |
| KR | 10-2013-0121012 A | 11/2013 |
| KR | 10-1461147 B1 | 11/2014 |
| KR | 101483328 B1 * | 1/2015 ............. C08L 33/04 |
| KR | 10-2016-0038324 A | 4/2016 |

(Continued)

OTHER PUBLICATIONS

Material Safety Data Sheet . Sigma Aldrich. Mar. 2004 retrieved from http://terpconnect.umd.edu/~choi/MSDS/Sigma-Aldrich/POLY(METHYL%20METHACRYLATE).pdf (Year: 2004).*

*Primary Examiner* — Cachet I Proctor
(74) *Attorney, Agent, or Firm* — Dentons US LLP

(57) ABSTRACT

The optical film according to the present invention has a feature that it has excellent property of blocking UV light and exhibits high slip property and thus enables self-winding even while using an acrylic resin not containing monomers having a ring structure.

19 Claims, No Drawings

(56) References Cited

FOREIGN PATENT DOCUMENTS

| KR | 10-2016-0062901 A | 6/2016 |
|----|-------------------|--------|
| KR | 10-2018-0000292 A | 1/2018 |
| KR | 10-2018-0020029 A | 2/2018 |
| TW | 200714985 A | 4/2007 |
| TW | 201041744 A | 12/2010 |
| WO | 2008136346 A1 | 11/2008 |
| WO | 2009119268 A1 | 10/2009 |
| WO | 2014185508 A1 | 11/2014 |
| WO | 2015162926 A1 | 10/2015 |

* cited by examiner

OPTICAL FILM WITH HIGH SLIP PROPERTY AND EXCELLENT PROPERTY OF BLOCKING UV LIGHT, AND POLARIZING PLATE COMPRISING THE SAME

CROSS-REFERENCE TO RELATED APPLICATION(S)

This application is a National Stage Entry of International Application No. PCT/KR2017/010256, filed on Sep. 19, 2017, and claims the benefit of and priority to Korean Application No. 10-2016-0120101, filed on Sep. 20, 2016, and Korean Application No. 10-2017-0119827, filed on Sep. 18, 2017 all of which are hereby incorporated by reference in their entirety for all purposes as if fully set forth herein.

TECHNICAL FIELD

The present invention relates to an optical film having high slip property and excellent property of blocking UV light, and a polarizing plate comprising the same.

BACKGROUND ART

A liquid crystal display uses a polarized light. For this purpose, a polarizing plate is used, and typically, a PVA element is used. However, the polarizing plate, such as the PVA element, has weak mechanical properties of its own and is easily influenced by external environment, for example, temperature or humidity. Thus, a protective film for protecting the polarizing plate is required.

Such a protective film should have excellent optical properties and excellent mechanical properties. TAC films (Tri-Acetyl-cellulose Film) have been conventionally used as a protective film for the PVA elements used in the polarizing plates. In recent years, however, acrylic films having heat resistance and absorption resistance superior to TAC films have been used.

The acrylic films for protecting polarizing plate are prepared by a stretching process. In this regard, acrylic resins having a glass transition temperature of 120° C. or higher are generally used so that the dimensional changes at high temperatures are small and the optical properties can be stably maintained. In addition, in order to further improve the dimensional stability and optical properties of the acrylic resins, a ring structure is introduced into the main chain thereof, and to this end, a monomer having a ring structure, which imparts heat resistance, is introduced. However, when the monomer having a ring structure is introduced, not only the price of raw materials increases, but also processing must be performed at higher temperature, which are problematic.

Meanwhile, the acrylic resin, particularly polymethyl methacrylate (PMMA), has excellent transparency and thus can be used as a protective film for polarizing plates. However, the glass transition temperature is low and thus the stretch hysteresis is loosened at high temperatures, which causes a deterioration in the dimensional stability. Further, when the polymethyl methacrylate is stretched and made into a film, there is a problem that the adhesiveness to a PVA element, which is a polarizing plate, varies depending on stretching conditions.

In addition, the acrylic film for protecting the polarizing plate has a large static electricity due to friction and has a severe blocking phenomenon which sticks in contact with each other between films. Therefore, for winding of the films, it is necessary to use polyolefin type or polyester type masking film or to introduce a primer layer capable of imparting a slip property. However, in the process of removing such masking film, traces can be left on the acrylic film, which may cause a deterioration in the quality of the acrylic film. Moreover, not only there is a demand for an equipment for adding or removing a masking film or for introducing a primer layer, but also there has been an economical problem of an increase in the product unit price due to the use of an additional film or primer.

Accordingly, the present inventors have conducted extensive studies to prepare an optical film capable of not only having excellent property of blocking UV light but also exhibiting high slip property so as to enable self-winding without using a separate masking film, even while using an acrylic resin not containing monomers having a ring structure in the main chain thereof. As a result, they have found that an optical film produced by containing an ultraviolet absorber and an organic particle and stretching the film as described later satisfies the above requirements, thereby completing the present invention.

DETAILED DESCRIPTION OF THE INVENTION

Technical Problem

It is one object of the present invention to provide a biaxially stretched optical film having high slip property and excellent property of blocking UV light.

It is another object of the present invention to provide a polarizing plate including the biaxially stretched optical film.

Technical Solution

In order to achieve the objects above, the present invention provides a biaxially stretched optical film including a substrate layer, wherein the substrate layer includes an acrylic resin, a poly(meth)acrylate-based organic particle having an average particle diameter of 0.3 μm m to 3 μm, and a ultraviolet absorber, and the optical film has a static friction coefficient between films of 0.7 or less.

An acrylic resin has excellent transparency and thus can be used as an optical film, in particular, as a protective film for polarizing plate. However, when the acrylic resin is prepared as a film, a stretching process must be used in order to increase the mechanical strength, but because the acrylic resin has a low glass transition temperature, the optical film prepared by stretching has a problem that the stretch hysteresis is loosened at high temperatures, which causes a deterioration in the dimensional stability. In order to improve such a problem, there has been suggested a method of introducing a ring structure in the main chain of the acrylic resin, but not only the preparation process is complex and the cost of base materials increases, but also processing must be performed at a higher temperature.

In addition, in order to wind the polarizing plate protective film, it is required to use a masking film or a primer layer so as not to cause a blocking phenomenon, but there is a problem of quality deterioration and unit price increase due to their use.

Accordingly, in the present invention, there is provided a biaxially stretched optical film not only having excellent property of blocking UV light by using a ultraviolet absorber in an acrylic resin as described later, but also having high slip property due to the unevenness of the surface caused by the introduction of organic particles and thus not requiring the use of another masking film.

Hereinafter, the present invention will be described in more detail.

Acrylic Resin

As used herein, the term 'acrylic resin' refers to a rein prepared by polymerization of acrylate-based monomers, and is the main component constituting the substrate layer in the present invention. In particular, the 'acrylic resin' has a feature that it does not contain a ring structure in the main chain.

Preferably, the acylate-based monomer has no ring structure in the main chain, and at least one selected from the group consisting of methyl methacrylate, methyl acrylate, ethyl acrylate, butyl acrylate, 2-ethylhexyl methacrylate, lauryl methacrylate and benzyl methacrylate can be used.

Further, the acrylic resin may further include a styrene-based monomer such as styrene, α-methylstyrene, p-methylstyrene, m-methylstyrene, benzoylstyrene or acrylonitrile, as needed.

The acrylic resin has a glass transition temperature of 100° C. to 120° C. If the glass transition temperature is less than 100° C., there is a problem that the thermal stability is deteriorated when produced into a film.

In addition, the acrylic resin has a weight average molecular weight of 100,000 to 150,000 g/mol. If the weight average molecular weight is less than 100,000 g/mol, there is a problem that the mechanical properties are deteriorated when produced into a film, and if the weight average molecular weight exceeds 150,000 g/mol, there is problem that it would be difficult to carry out an extrusion process.

In particular, the acrylic resin may be polymethyl methacrylate (PMMA), which is a copolymer of methyl methacrylate and methyl acrylate. Specifically, methyl methacrylate and/or methyl acrylate may be used as the acrylate-based monomer. Preferably, the acrylic resin includes 90 to 99% by weight of methyl methacrylate and 1 to 10% by weight of a methyl acrylate monomer. The methyl acrylate serves to inhibit the degradation of the copolymer.

The polymethyl methacrylate may be prepared by a known method, except that methyl acrylate is used in addition to methyl methacrylate. For example, it can be prepared by a method such as emulsion polymerization, emulsion-suspension polymerization, suspension polymerization, etc. In addition, in order to introduce a methyl acrylate monomer into the terminal of the polymethyl methacrylate, polymethyl methacrylate may be polymerized first, and then the methyl acrylate monomer may be polymerized.

Poly(Meth)Acrylate-Based Organic Particle

As used herein, the term "poly(meth)acrylate-based organic particle" is distinguished from inorganic fine particles such as silicon oxide, zirconium oxide, zinc oxide or the like, and refers to a polymer particle prepared by using a (meth)acrylate-based monomer in an amount of 50% by weight or more. At this time, the poly(meth)acrylate-based organic particle is distinguished from an elastic polymer or a soft particle including an elastic layer in that it is a hard particle and an organic bead having no elasticity.

The poly(meth)acrylate-based organic particles are introduced so as to enable self-winding by imparting slip property to the surface of the optical film of the present invention. Specifically, the poly(meth)acrylate-based organic particles are dispersed in the acrylic resin and the polycarbonate resin described above to impart unevenness to the surface of the film, thereby improving the slip property of the optical film. The improvement of the slip property can be confirmed by measuring the coefficient of friction between films as will be described later. It can be seen that the optical film according to the present invention exhibits a static friction coefficient between films of 0.7 or less and thus has high slip property.

In order for the poly(meth)acrylate-based organic particles contained in the substrate layer not to lower the light transmittance even while imparting unevenness on the surface of the biaxially stretched optical film, the average particle diameter of the organic particles is within the range of 0.3 μm to 3 μm. If the particle size of the organic particles is less than 0.3 μm, the unevenness may be formed too small on the surface of the optical film, and thus self-winding may not be easy due to an increase in the coefficient of friction between the films. If the particle size exceeds 3 μm, not only the surface haze increases and the light transmittance of the film decreases, but also problems can be caused during extrusion processing. Preferably, the particle size of the poly(meth)acrylate-based organic particles may be 0.35 μm to 2 μm, or 0.4 μm to 1.5 μm.

In addition, the poly(meth)acrylate-based organic particles may be monodisperse particles. Specifically, the poly(meth)acrylate-based organic particles preferably have a particle size distribution of −20% to +20%. By using the organic particles having the above distribution, it is possible to prevent an increase in haze and a decrease in light transmittance of the optical film.

Further, the poly(meth)acrylate-based organic particles may be crosslinked polymer particles. Specifically, the poly(meth)acrylate-based organic particles may be crosslinked polymer particles having a structure in which a main chain composed of repeating units derived from (meth)acrylate-based monomers is crosslinked with a crosslinking agent. When the crosslinked polymer particles are used, it has excellent heat resistance as compared with non-crosslinked polymer particles, which is thus preferable.

Specifically, as the (meth)acrylate-based monomers, one or more (meth)acrylate-based monomers selected from the group consisting of methyl(meth)acrylate, ethyl(meth)acrylate, propyl(meth)acrylate, n-butyl(meth)acrylate, isobutyl (meth)acrylate, t-butyl(meth)acrylate, 2-ethylhexyl(meth) acrylate, n-octyl(meth)acrylate, lauryl(meth)acrylate, stearyl (meth)acrylate, 2-hydroxyethyl(meth)acrylate, polyethylene glycol(meth)acrylate, methoxypolyethylene glycol(meth) acrylate, glycidyl (meth)acrylate, dimethylaminoethyl (meth)acrylate and diethylaminoethyl (meth)acrylate can be used, but are not limited thereto.

Further, as the crosslinking agent, one or more monomeric compounds or monomolecular compounds selected from the group consisting of ethylene glycol di(meth)acrylate, trimethylolpropane tri(meth)acrylate, allyl(meth)acrylate, diethylene glycol di(meth)acrylate, propylene glycol di(meth) acrylate, 2,2-dimethylpropane-1,3-di(meth)acrylate, 1,3-butylene glycol di(meth)acrylate, 1,4-butanediol di(meth) acrylate, diethylene glycol di(meth)acrylate, 1,6-hexanediol di(meth)acrylate, tripropylene glycol di(meth)acrylate, triethylene glycol di(meth)acrylate, tetraethylene glycol di(meth)acrylate, polyethylene glycol di(meth)acrylate, ethoxylated bisphenol A di(meth)acrylate, poly(butanediol) di(meth)acrylate, pentaerythritol tri(meth)acrylate, trimethylolpropane triethoxy tri(meth)acrylate, glyceryl propoxy tri(meth)acrylate, pentaerythritol tetra(meth)acrylate, divinylbenzene (DVB), vinyl urethane, diallyl ether, diallyl ester, vinyl polyester, trivinylbenzene, divinyltoluene, diallyloxyacetic acid, divinyl pyridine, divinylnaphthalene, vinylxylene, diethylene glycol divinyl ether, bisacrylamide, triallyl cyanurate, trivinylcyclohexane, divinylsilane, trivinylsilane, dimethyl divinyl silane, divinylmethylsilane, methyltrivinylsilane, diphenyl divinyl silane, trivinyl phenyl silane, divinylmethylphenyl silane, tetravinylsilane, dimethyl vinyl disiloxane, poly(methylvinylsiloxane), poly(vinylhydrosiloxane) and poly(phenylvinylsiloxane) can be used, but are not limited thereto.

Further, the poly(meth)acrylate-based organic particles may be selected so that the difference between the refractive index (1.49) of an acrylic resin which is a main component of the substrate layer, specifically polymethyl methacrylate (PMMA), becomes 0.05 or less. This is for preventing an increase in internal haze due to scattering in the film because the difference in refractive index between the fine particles and the resin in which the fine particles are dispersed is large.

Accordingly, the refractive index of the poly(meth)acrylate-based organic particles is preferably 1.44 to 1.54.

The thermal decomposition temperature (Td, in air) of 10% of the poly(meth)acrylate-based organic particles may be 250° C. or higher. At this time, the "thermal decomposition temperature of 10% of the organic particles" means the temperature at the time when the proportion of decrease in the weight of the organic particles reached 10% by thermal decomposition when being measured by thermogravimetric analysis. Organic particles having a thermal decomposition temperature of less than 250° C. do not have sufficient heat resistance and thus can be decomposed during stretching and/or molding processing of the film to generate fume, bubbles, etc., which can cause defective appearance of the film. Specifically, the thermal decomposition temperature (Td) of 10% of the organic particles is preferably 250° C. to 270° C.

Therefore, in the case of soft particles having elasticity, not hard particles such as poly(meth)acrylate-based organic particles of the present invention, they have low thermal decomposition temperature, and thus thermal stability is deteriorated and thermally decomposed in the extrusion process to generate fumes, which can cause a problem of poor appearance of the film.

The organic particles may be contained in an amount of 0.01 to 0.5 parts by weight based on 100 parts by weight of the acrylic resin and the polycarbonate. When the content is less than 0.01 parts by weight, self-winding is not possible due to an increase in the coefficient of friction between films. If the content is more than 0.5 parts by weight, haze of the film may increase due to an increase in surface unevenness of the film, and the film may be broken at the time of stretching. Preferably, the content (parts by weight) of the organic particles is 0.05 parts by weight or more, n 0.06 parts by weight or more, or 0.07 parts by weight or more, and 0.4 parts by weight or less, or 0.3 parts by weight or less, or 0.2 parts by weight or less, based on 100 parts by weight of the acrylic resin and the polycarbonate.

Ultraviolet Absorber

In the present invention, the ultraviolet absorber is contained in the substrate layer and is used for effectively blocking ultraviolet light that enter from the outside.

As the ultraviolet absorber usable in the present invention, the biaxially stretched optical film according to the present invention can be used without particular limitation as long as it can have a light transmittance at a wavelength of 380 nm of 20% or less, preferably 10% or less, under the condition that the optical film has a thickness of 40 μm. For example, as the ultraviolet absorber, a benzophenone-based ultraviolet absorber, a benzotriazole-based ultraviolet absorber, a triazine-based ultraviolet absorber, a salicylate-based ultraviolet absorber, and the like, which are well-known in the art, can be used.

Among them, a triazine-based ultraviolet absorber is preferable. In this case, the thermal stability and ultraviolet absorbing effect are excellent, and thus a sufficient ultraviolet blocking effect can be obtained even when contained in an appropriate amount. Furthermore, fume phenomenon or migration phenomenon that may occur during the film formation process can be prevented. Examples of the triazine-based ultraviolet absorber include a compound having a 2,4,6-triphenyl-1,3,5-triazine skeleton as a main component, and various triazine-based ultraviolet absorbers commercially available in the art can be used without particular limitation.

The ultraviolet absorber is preferably contained in an amount of 0.1 to 5 parts by weight based on 100 parts by weight of the acrylic resin. If the content of the ultraviolet absorber is less than the above range, it does not have a sufficient ultraviolet blocking effect. If the content of the ultraviolet absorber exceeds the above range, there is a problem that, while the ultraviolet absorber is decomposed in the process of producing the optical film, a migration phenomenon of migrating out of the film occurs.

Substrate Layer

In the present invention, the substrate layer is prepared as a composition containing the acrylic resin, the organic particle and the ultraviolet absorber as described above. For example, the acrylic resin, the organic particle and the ultraviolet absorber are melt-kneaded to form a composition, which is then formed into an unstretched film, thereby preparing the substrate layer.

In addition, the substrate layer may further include a retardation controller for controlling the retardation. When the acrylic resin is stretched, it has a negative birefringence property in which the refractive index increases in a direction perpendicular to the stretching direction. Accordingly, in order to realize the retardation, a retardation controller having a positive birefringence property in which the refractive index increases in the stretching direction is required.

Preferably, the retardation controller may use a polycarbonate. As used herein, the term 'polycarbonate' is formed by reacting an aromatic diol compound with a carbonate precursor, and can be prepared by interfacial polymerization or solution polymerization. For example, it can be prepared by interfacial polymerization of bisphenol A and phosgene.

When the polycarbonate is additionally included, the weight average molecular weight of the polycarbonate is preferably 10,000 to 20,000 in consideration of its compatibility with the acrylic resin. When the weight average molecular weight of the polycarbonate exceeds 20,000, the compatibility with the acrylic resin is lowered, and an opaque composition is formed as a whole, which is not preferable for use as an optical film.

Furthermore, the polycarbonate is contained in an amount of 10% by weight or less based on the total weight of the acrylic resin and the polycarbonate. If the content thereof exceeds 10% by weight, an opaque composition is formed as a whole, which is not preferable. Further, preferably, the polycarbonate is contained in an amount of 1% by weight or more, or 2% by weight or less based on the total weight of the acrylic resin and the polycarbonate.

Further, the composition may include additives such as heat stabilizers, lubricants and the like, as needed. At this time, the additives may be contained in an appropriate amount within a range in which the physical properties of the composition are not impaired, and may be contained, for example, in an amount of 0.1 to 5 parts by weight based on 100 parts by weight of the entire composition.

Furthermore, as a method for preparing a film from the composition, any method known in the art, for example, a solution casting method, an extrusion method or the like may be used. In one example, a melt extrusion molding method may be used.

Specifically, the resin composition for optical materials is dried to remove moisture, and then an extruder is fed from a raw material hopper to a single or twin extruder, and the composition is melted at a high temperature to obtain a raw material pellet. The thus-obtained raw material pellet is then dried, melted by the single extruder from the raw material hopper to the extruder and then passed through a coat hanger type T-die, thereby forming a film via a chromium-plated casting roll, a cooling roll and the like. At this time, the film-molding temperature is preferably 150° C. to 350° C., more preferably 200° C. to 300° C. Meanwhile, as described above, when a film is formed by the T-die method, a T-die is attached to the tip of a known single- or twin-screw extruder, and a film extruded in the form of a film is wound to obtain a roll-shaped film. In addition, a polymer filter may be used to remove foreign substances during film molding.

Primer Layer

The optical film may further include a primer layer formed on one surface of the substrate layer. At this time, the primer layer is formed on one surface of the substrate layer to be attached to the polarizing plate as needed. When the optical film is produced by biaxial stretching as described later, the adhesiveness to the polarizing plate, for example, a PVA element, can be improved. In addition, the primer layer can prevent the film from being eroded by the coating liquid when coating the surface of the optical film.

The primer layer includes a polyester-based resin, a polyurethane-based resin, or a mixture thereof. When the primer layer includes both a polyester-based resin and a polyurethane-based resin, it includes 70 to 95 parts by weight of a polyester-based resin and 5 to 30 parts by weight of a polyurethane-based resin.

The polyester-based resin refers to a resin including an ester group, which is formed by reacting carboxylic acid and alcohol in the main chain. Preferably, it may be a water-dispersible polyester resin, and more preferably, may include polyester glycol formed by reacting polybasic acid and polyol.

Further, the polyurethane-based resin refers to a resin including a urethane repeating unit, which is formed by a reaction between isocyanate and polyol in the main chain. Herein, the isocyanate is a compound having two or more NCO groups, and the polyol is a compound having two or more hydroxyl groups, and examples thereof include a polyester-based polyol, a polycarbonate-based polyol, a polyether polyol, and the like, but are not limited thereto.

In addition, the primer layer may further include water-dispersible fine particles and water-dispersible crosslinking agent as needed. As the water-dispersible fine particles, at least one selected from the group consisting of silica, titania, alumina, zirconia, and antimony-based fine particles may be used, and preferably, silica may be used. When silica is used, colloidal silica may be preferably used. The diameter of the water-dispersible fine particles is 50 nm to 500 nm, preferably 100 nm to 300 nm.

The primer layer may be prepared by coating a primer solution including the polyester-based resin and polyurethane-based resin, and the coating method is not particularly limited. For example, a bar coating method, a microgravure coating method, a slot die coating method, a comma coating method and the like may be used.

In addition, the primer layer may have an antistatic property as needed. To this end, the primer layer may include a surfactant, an organic salt, an inorganic salt, a conductive filler, a conductive polymer, a block copolymer, metal oxide and the like in an amount of 0.1 to 10% by weight. Further, the primer layer may have an UV-blocking property as needed. To this end, the primer layer may include a ultraviolet absorber in an amount of 0.1 to 10% by weight. The ultraviolet absorber is not particularly limited as long as it is used for an optical film, and for example, a triazine-based, a benzotriazole-based, or a benzophenol-based ultraviolet absorber may be used.

When the aforementioned primer layer is used, the adhesive strength between the substrate layer and the primer layer is excellent, and even in the biaxial stretching of the base layer and the primer layer, the adhesion of the primer layer can be improved while maintaining the properties of each layer.

Biaxially Stretched Optical Film

The biaxially stretched optical film according to the present invention includes the aforementioned substrate layer. The biaxial stretching means that an unstretched film including a substrate layer is biaxially stretched. Specifically, the biaxial stretching means that an unstretched film including a substrate layer is uniaxially stretched in the longitudinal direction and then stretched in the traverse direction, or that an unstretched film is uniaxially stretched in the traverse direction and then stretched in the longitudinal direction.

In this case, the biaxially stretched optical film is prepared by a preparation method including the steps of preparing an unstretched film including the substrate layer described above; and biaxially stretching the unstretched film.

Alternatively, if necessary, the biaxially stretched optical film is prepared by a preparation method including the steps of preparing an unstretched film by forming the aforementioned substrate layer and a primer layer on the substrate layer; and biaxially stretching the unstretched film. Alternatively, the biaxially stretched optical film is prepared by a preparation method including the steps of uniaxially stretching the aforementioned substrate layer in the longitudinal direction; forming a primer layer on the uniaxially stretched substrate layer; and stretching the substrate layer and the primer layer in the traverse direction.

Preferably, the stretching magnification is 1.2 times to 3.0 times in the MD direction and 1.5 times to 4.0 times in the TD direction. The stretching aligns the polymers and has an effect on the properties of the biaxially stretched optical film prepared according to the degree of stretching. More preferably, the ratio of the stretching magnification in the MD direction to the stretching magnification in the TD direction (TD stretching magnification/MD stretching magnification) is 1.0 to 2.5.

Further, it is preferred that the stretching is performed within a temperature range of −10° C. to +20° C. based on the glass transition temperature. The stretching temperature has an effect on the adhesiveness of the biaxially stretched optical film, and there is a problem that the adhesiveness may not be sufficient if the temperature is out of the range.

Furthermore, the biaxially stretched optical film according to the present invention has excellent dimensional stability, and in order to evaluate such thermal dimensional stability, a variable known as TTS (Temperature of Thermal Shrinkage) was introduced.

TTS refers to a temperature at which an optical film prepared in the stretching step starts to shrink sharply while the stretch hysteresis is loosened. Specifically, when the temperature is applied to the optical film, it refers to a temperature at which an optical film starts to shrink after expansion as the temperature increases. Preferably, the TTS in the MD direction and the TTS in the TD direction of the biaxially stretched optical film according to the present invention are 95° C. or higher, and preferably 100° C. to 120° C., respectively.

Meanwhile, the thickness of the biaxially stretched optical film according to the present invention may be appropriately adjusted as needed, and for example, it may preferably be 10 μm to 100 μm.

Meanwhile, as described above, the biaxially stretched optical film according to the present invention has an uneven structure of nm size on the surface of the film due to introduction of organic particles and thus exhibits a static friction coefficient between films of 0.7 or less. When the static friction coefficient exceeds 0.7, a blocking phenomenon can occur due to friction between films, and self-winding is impossible. Preferably, the biaxially stretched optical film has the static friction coefficient between films of 0.6 or less, 0.5 or less, or 0.45 or less. The lower the static friction coefficient, the better the slip property. Thus, the lower limit thereof is not limited, but the lower limit thereof can be, for example, 0.01 or more, 0.05 or more, 0.1 or more, or 0.2 or more.

In addition, the kinetic friction coefficient between films of the biaxially stretched optical film may be 0.7 or less. Preferably, the kinetic friction coefficient between films of the biaxially stretched optical film may be 0.6 or less, 0.5 or less, or 0.45 or less, and the lower limit thereof may be, for example, 0.01 or more, 0.05 or more, 0.1 or more, or 0.2 or more.

The static friction coefficient can be measured from a load value at the moment when one of two films starts to move in a static state after applying a constant load to two contacting optical films. The kinetic friction coefficient can be measured from a load value during the movement of one of the films after applying a constant load to two contacting optical films.

Meanwhile, the uneven surface shape of the biaxially stretched optical film can be confirmed by measuring the average roughness (Ra) of the surface.

Specifically, the average roughness (Ra) of the surface of the biaxially stretched optical film can be 4 nm to 30 nm. When the average roughness (Ra) due to the surface unevenness is less than 4 nm, the slip property cannot be good due to an increase in the value of the fraction coefficient between films. When the average roughness (Ra) exceeds 30 nm, the haze of the film may be increased. Specifically, the average roughness (Ra) of the surface is preferably 4.5 nm to 20 nm, more preferably 4.5 nm to 10 nm.

Here, the average surface roughness (Ra) represents the arithmetic mean of the absolute value of the height of the uneven shape of the surface, which is calculated by the following mathematical formula 1 and can be measured by AFM (Atomic Force Microscopy).

$$R_a = \frac{1}{L}\int_0^L |f(x)|\,dx \quad \text{[Mathematical Formula 1]}$$

in Mathematical Formula 1,

L means the reference length for performing the measurement, and a function f(x) means the roughness curve obtained through measurement.

In addition, the internal haze of the biaxially stretched optical film is 0.5% or less, and the external haze may be 0.3% to 3.5%. In the case of the optical film showing the haze in the above range, the introduction of the organic particles exhibits high slip property and does not deteriorate the light transmittance, so that it can be useful as a protective film for a polarizing plate. Preferably, the internal haze of the biaxially stretched optical film may be more than 0 and 0.3% or less, and the external haze may be 0.4% to 1.0%.

Here, the internal haze of the biaxially stretched optical film can be measured by attaching a pressure-sensitive adhesive having a haze of 0 to the surface to prepare a flattening layer, or by coating a flattening layer onto the alkali-treated surface. The external haze of the optical film can be measured by subtracting the internal haze value from the total haze obtained by measuring the haze for the film itself.

Moreover, the optical film according to the present invention has excellent property of blocking UV light. Specifically, the optical film has a feature that a light transmittance at a wavelength of 380 nm is 20% or less, preferably 10% or less, under the condition that the thickness of the optical film is 40 μm. This is because the ultraviolet absorber is contained in the substrate layer. Preferably, the light transmittance at 380 nm is 9% or less, 8% or less, 7% or less, 6% or less, or 5% or less. In addition, the smaller the value of the light transmittance at 380 nm, the better the lower limit. Thus the is theoretically 0%, for example, the lower limit thereof may be 0.5%, 1%, or 2%. The transmittance can be measured by a spectrometry apparatus such as U-3310 manufactured by Hitachi.

Polarizing Plate

In addition, the present invention provides a polarizing plate comprising a polarizer and the above-mentioned biaxially stretched optical film provided on at least one surface of the polarizer. As described above, the biaxially stretched optical film according to the present invention can be used as a protective film for a polarizing plate and accordingly, it can supplement the mechanical properties of the polarizing plate and protect the polarizing plate from the external environment, for example, from the influence of temperature or humidity.

As used herein, the polarizing plate means a state in which a polarizer and a protective film are included. As the polarizer, a film composed of polyvinyl alcohol (PVA) including iodine or a dichroic dye may be used. The polarizer can be prepared by impregnating iodine or a dichroic dye into a PVA film, but the preparation method thereof is not particularly limited.

Further, the protective film according to the present invention may be provided on both surfaces of the polarizer, or may be provided only on one surface of the polarizer. When the optical film of the present invention is provided on one surface of the polarizer, on the other surface, a polarizer protective film such as an acrylic film, a TAC film, a PET film, a COP film, a PC film, a norbornene-based film or the like, which are well known in the art, can be used without limitation.

The protective film and the polarizer may be adhered by an ultraviolet curable adhesive which is a water-based adhesive or a non-aqueous adhesive commonly used in the art. At this time, the application of the adhesive can be performed regardless of the surface to which the primer layer of the protective film is applied or the surface to which the primer layer is not applied. Specifically, as the adhesive, a polyvinyl alcohol-based adhesive, a (meth)acrylate-based adhesive, an ene/thiol-based adhesive, an unsaturated polyester-based adhesive, an epoxy adhesive, or a urethane-based adhesive can be used without limitation.

In addition, the present invention provides an image display device including the polarizing plate, and more preferably, it may be a liquid crystal display device. For example, the liquid crystal display device according to the present invention is a liquid crystal display device including a liquid crystal cell, and a first polarizing plate and a second polarizing plate each provided both surfaces of the liquid crystal cell, wherein at least one of the first polarizing plate and the second polarizing plate is the polarizing plate according to the present invention. In this case, the optical film or the polarizer protective film provided on the opposite side of the polarizing plate from the liquid crystal cell is preferably a protective film according to the present invention containing a ultraviolet absorber, and furthermore, it can be subjected to surface coating, such as an AG coating (anti-glare coating), LR coating (low reflection coating) and the like.

Advantageous Effects

As described above, the biaxially stretched optical film according to the present invention has excellent property of blocking UV light and exhibits high slip property and thus enables self-winding even while using an acrylic resin not containing monomers having a ring structure.

DETAILED DESCRIPTION OF THE EMBODIMENTS

Hereinafter, preferred examples are presented to aid in the understanding of the invention. However, the following examples are provided only to facilitate understanding of the present invention, and the scope of the present invention is not limited thereto.

Preparation Example 1: Polymethyl Methacrylate 1000 g of a monomer mixture containing 98 wt % of methyl methacrylate and 2 wt % of methyl acrylate were added to a 5 L reactor, and 2000 g of distilled water, 8.4 g of a 5% polyvinyl alcohol solution (POVAL PVA217, manufactured by Kuraray) and 0.1 g of boric acid as a dispersion aid were added and dissolved. 2.5 g of n-octyl mercaptane as a chain transfer agent and 1.5 g of 2,2'-azobisisobutyronitrile as a polymerization initiator were added thereto and dispersed in water phase while stirring at 400 rpm to prepare a suspension solution. The temperature was raised to 80° C. to carry out polymerization for 90 minutes, and then the resultant was cooled to 30° C. The thus-obtained beads were washed with distilled water, dehydrated and then dried to prepare a polymethyl methacrylate resin. The glass transition temperature and the molecular weight of the prepared resin were measured, and as a result, the glass transition temperature was 114° C., and the weight average molecular weight was 120,000 g/mol. The glass transition temperature was measured using a differential scanning calorimeter (DSC) manufactured by Mettler Toledo at a temperature rising rate of 10° C./min Preparation Example 2: Polycarbonate As the polycarbonate, a polycarbonate resin having a glass transition temperature of 134° C. and a weight average molecular weight of 16,000 g/mol was used (UF 1004A, manufactured by LG Chem).

Examples 1 to 3

The polymethyl methacrylate prepared in Preparation Example 1 and the polycarbonate of Preparation Example 2 were respectively added as shown in Table 1 below, to which organic particles (MX-80H 3WT manufactured by Soken Chemical & Engineering, a spherical crosslinked acrylic polymer monodisperse particle having a refractive index of 1.49 and an average particle size of 0.8 μm) and an ultraviolet absorber (LAF70, manufactured by Adeka) as shown in Table 1 below were added. An antioxidant (Irganox 1010, manufactured by BASF) was added in an amount of 0.4 phr and dry blended, followed by compounding with a twin extruder to prepare a resin composition. The resin composition was melted at 265° C. and subjected to extrusion casting in the form of a sheet through a T-die to obtain a sheet having a thickness of 180 μm.

Optical films were prepared by biaxially stretching the unstretched film using the stretching temperature and stretching magnification as shown in Table 1 below.

Example 4

An optical film was prepared in the same manner as in Example 1, except that a spherical organic particle (MX-80H3WT, manufactured by Soken Chemical & Engineering) having a refractive index of 1.49 and an average particle size of 0.4 μm was used.

Comparative Example 1

An unstretched film was produced in the same manner as in Example 3, except that a ultraviolet blocking agent was not used. Optical film was prepared by biaxially stretching the unstretched film using the stretching temperature and stretching magnification as shown in Table 1 below.

Comparative Example 2

An unstretched film was produced in the same manner as in Example 3, except that an organic particle and a ultraviolet blocking agent were not used. Optical film was prepared by biaxially stretching the unstretched film using the stretching temperature and stretching magnification as shown in Table 1 below.

Comparative Example 3

An unstretched film was produced in the same manner as in Example 3, except that a ultraviolet blocking agent was not used, and the organic particle (SX-130H manufactured by Soken Chemical & Engineering, a spherical crosslinked styrene monodisperse particle having a refractive index of 1.59 and an average particle size of 3 μm) was added instead of the organic particle of Examples. Optical film was prepared by biaxially stretching the unstretched film using the stretching temperature and stretching magnification as shown in Table 1 below.

Comparative Example 4

An unstretched film was produced in the same manner as in Example 1, except that an organic particle was not used. Optical film was prepared by biaxially stretching the unstretched film using the stretching temperature and stretching magnification as shown in Table 1 below.

Comparative Example 5

An unstretched film was produced in the same manner as in Example 1, except that the organic particle (SX-130H manufactured by Soken, a spherical crosslinked styrene monodisperse particle having a refractive index of 1.59 and an average particle size of 3 μm) was added instead of the organic particle of Examples. Optical film was prepared by biaxially stretching the unstretched film using the stretching temperature and stretching magnification as shown in Table 1 below.

Comparative Example 6

An unstretched film was produced in the same manner as in Example 2, except that the organic particle (a spherical crosslinked acrylic particle having a refractive index of 1.49 and an average particle size of 0.2 μm) was added instead of the organic particle of Examples. Optical film was prepared by biaxially stretching the unstretched film using the stretching temperature and stretching magnification as shown in Table 1 below.

Comparative Example 7

An unstretched film was produced in the same manner as in Example 2, except that the content of the organic particle was used as shown in Table 1 below. Optical film was prepared by biaxially stretching the unstretched film using the stretching temperature and stretching magnification as shown in Table 1 below.

Experimental Example

The optical films prepared in Examples and Comparative Examples above were evaluated by the following methods.

1) TTS (Temperature of Thermal Shrinkage): The optical films were measured with a TA TMA (Q400) apparatus after preparing a sample with dimensions of 10 mm×4.5 mm. Specifically, when the temperature was applied under the conditions of a temperature raising rate of 10° C./min and a load of 0.02 N, the inflection point temperature (tangential slope of 0) at which the sample begins to contract after expansion in the MD and TD directions was set as the TTS value.

2) Retardation Value: The retardation value was measured at a wavelength of 550 nm using a birefringence meter (AxoScan, manufactured by Axometrics). As the measured values for the refractive index (nx) in the direction in which the refractive index is the largest in a plane of the optical film, the refractive index (ny) in the direction perpendicular to nx, the refractive index (nz) in the thickness direction of the optical film, and the thickness (d, nm) of the optical film, the in-plane retardation (Rin) and the retardation (Rth) in the thickness direction were calculated according to Mathematical Formulas below.

$$Rin(nm) = (nx - ny) \times d$$

$$Rth(nm) = (nz - ny) \times d$$

3) Light transmittance: The light transmittance at a wavelength of 380 nm was measured using a spectrometry apparatus (U-3310, manufactured by Hitachi). At this time, the thickness of the optical film was 40 μm.

4) Haze Value: The total haze of the optical film is the sum of the internal haze and the external haze. The total haze and the internal haze are measured by the following manner, and then the external haze was calculated by the difference between the total haze and the internal haze measured. Specifically, the haze was measured three times according to JIS K 7105 standard using a haze measuring apparatus (HM-150, A light source, Murakami Co.), and the respective average values were calculated to obtain the total haze. Further, in order to make the surface of the manufactured optical film flat, an adhesive having a haze of 0 was attached to the surface, and then the external unevenness were embedded in the adhesive. After that, the haze was measured three times with the haze measuring apparatus, and then the average value was calculated to obtain the internal haze. Subsequently, the internal haze value was subtracted from the obtained total haze value to obtain the external haze.

5) Friction Coefficient: According to the static friction coefficient measurement standard of the film shown in ASTM D1894, a constant load was applied to two contacting optical films and then the force at the moment when one of two films starts to move in a static state was measured, and the static friction coefficient between films was measured.

6) Average Surface Roughness (Ra): The average surface roughness (Ra) of the optical film was measured according to by the above mathematical formula 1 via a tapping mode in which the surface of the sample was tapped at a constant speed using AFM (Atomic Force Microscopy).

The results are shown in Tables 1 and 2 below.

TABLE 1

| | | Example 1 | Example 2 | Example 3 | Example 4 |
|---|---|---|---|---|---|
| Polymethyl methacrylate (wt %) | | 100 | 100 | 97.3 | 100 |
| Polycarbonate (wt %) | | — | — | 2.7 | — |
| Organic particle | Content (phr)[1] | 0.07 | 0.1 | 0.1 | 0.07 |
| | Refractive index | 1.49 | 1.49 | 1.49 | 1.49 |
| | Average particle size (μm) | 0.8 | 0.8 | 0.8 | 0.4 |
| Ultraviolet absorber (phr)[1] | | 0.8 | 0.8 | 0.8 | 0.8 |
| Glass transition temperature[2] (Tg, ° C.) | | 114 | 114 | 115 | 114 |
| Stretching temperature (° C.) | | Tg + 15 | Tg + 20 | Tg + 15 | Tg + 15 |
| Stretching magnification (MD/TD) | | 1.8/2.56 | 1.8/2.56 | 1.8/2.56 | 1.8/2.56 |
| TTS (MD/TD, ° C.) | | 103/102 | 105/104 | 103/104 | 102/102 |
| Retardation (Rin/Rth) | | 0.9/16.5 | 0.8/13.5 | 0.8/16.0 | 1.0/16.0 |
| Light transmittance (380 nm, %) | | 4.7 | 4.5 | 4.6 | 4.6 |
| External haze (%) | | 0.6 | 0.9 | 1.0 | 0.3 |
| Internal haze (%) | | 0.2 | 0.2 | 0.2 | 0.2 |
| Static friction coefficient | | 0.49 | 0.43 | 0.39 | 0.68 |
| Average Roughness (Ra, nm) | | 4.8 | 5.0 | 4.9 | 4.1 |

[1] Part by weight relative to total 100 parts by weight of polymethyl methacrylate and polycarbonate
[2] Glass transition temperature of polymethyl methacrylate

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Polymethyl methacrylate(wt %) | 97.3 | 97.3 | 97.3 | 100 | 100 | 100 | 100 |
| Polycarbonate (wt %) | 2.7 | 2.7 | 2.7 | — | — | — | — |
| Organic particle Content(phr)[1] | 0.1 | — | 0.1 | — | 0.1 | 0.1 | 0.6 |
| Refractive index | 1.49 | — | 1.59 | — | 1.59 | 1.49 | 1.49 |
| Average particle size(μm) | 0.8 | — | 3 | — | 3 | 0.2 | 0.8 |
| Ultraviolet absorber(phr)[1] | — | — | — | 0.8 | 0.8 | 0.8 | 0.8 |
| Glass transition temperature[2] (Tg, ° C.) | 115 | 115 | 115 | 114 | 114 | 114 | 114 |
| Stretching temperature (° C.) | Tg + 15 | Tg + 15 | Tg + 15 | Tg + 15 | Tg + 15 | Tg + 15 | Tg + 15 |
| Stretching magnification (MD/TD) | 1.8/2.56 | 1.8/2.56 | 1.8/2.56 | 1.8/2.56 | 1.8/2.56 | 1.8/2.56 | 1.8/2.56 |
| TTS(MD/TD, ° C.) | 104/103 | 104/103 | 103/102 | 104/103 | 103/102 | 104/103 | Not stretchable |
| Retardation (Rin/Rth) | 0.5/0.9 | 0.5/0.9 | 0.6/0.8 | 1.0/16.2 | 1.1/16.7 | 0.8/16.5 | — |
| Light transmittance (380 nm, %) | 91.6 | 91.5 | 89.6 | 4.5 | 4.2 | 4.2 | — |
| External haze (%) | 0.9 | 0 | 1.4 | 0 | 1.4 | 0.1 | — |
| Internal haze (%) | 0.2 | 0.2 | 0.8 | 0.2 | 0.8 | 0.2 | — |
| Static friction coefficient | 0.43 | Not measurable | 0.49 | Not measurable | 0.50 | 0.8 | — |
| Average Roughness (Ra, nm) | 4.9 | 2.4 | 5.0 | 2.2 | 5.0 | 2.2 | — |

[1] Part by weight relative to total 100 parts by weight of polymethyl methacrylate and polycarbonate
[2] Glass transition temperature of polymethyl methacrylate As shown in Tables 1 and 2, Examples 1 to 4 according to the present invention all exhibited the light transmittance at 380 nm of 5% or less and had a low haze and a friction coefficient of 0.5 or less. On the other hand, in Comparative Examples 1 to 3, since the ultraviolet absorbent was not included, it was confirmed that the light transmittance at 380 nm was high and the ultraviolet absorber was not substantially absorbed. In Comparative Examples 2 and 4, since organic particles were not included, unevenness could not be formed on the surface of the film, resulting in a low average roughness, and thus the static friction coefficient could not be measured. In addition, in Comparative Example 3 and 5, since the organic particle having a high refractive index and a large average particle size was used, it was confirmed that the internal and external haze were high. Further, in Comparative Example 6, since the organic particles having a small average particle size were used, the surface of the film had less unevenness and the static friction coefficient was higher, thereby deteriorating the slip property. Further, in Comparative Example 7, since the content of the organic particle was high, the film was broken at the time of stretching and thus it was impossible to manufacture a biaxially stretched optical film.

Accordingly, it was confirmed that the optical film according to the present invention exhibited high slip property even while having excellent property of blocking UV light.

The invention claimed is:

1. A biaxially stretched optical film comprising a substrate layer, wherein the substrate layer includes a resin, a poly(meth)acrylate-based organic particle having an average particle diameter of 0.3 μm to 3 μm, and a ultraviolet absorber,
    wherein the optical film has a static friction coefficient between films of 0.7 or less,
    wherein the resin includes an acrylic resin and optionally a polycarbonate, and the acrylic resin accounts for 97.3 wt % or more relative to the total weight of the resin,
    wherein the thermal decomposition temperature (Td) of 10% of the poly(meth)acrylate-based organic particle is 250° C. or higher, and
    wherein the poly(meth)acrylate-based organic particle is contained in an amount of 0.01 to 0.5 parts by weight based on total 100 parts by weight of the resin.

2. The biaxially stretched optical film of claim 1, wherein the acrylic resin does not include a ring structure in the main chain.

3. The biaxially stretched optical film of claim 1, wherein the acrylic resin has a glass transition temperature of 100 to 120° C.

4. The biaxially stretched optical film of claim 1, wherein the acrylic resin has a weight average molecular weight of 100,000 to 150,000 g/mol.

5. The biaxially stretched optical film of claim 1, wherein the acrylic resin is a copolymer of methyl methacrylate and methyl acrylate.

6. The biaxially stretched optical film of claim 5, wherein the acrylic resin includes 90 to 99% by weight of methyl methacrylate and 1 to 10% by weight of methyl acrylate monomer.

7. The biaxially stretched optical film of claim 1, wherein the refractive index of the poly(meth)acrylate-based organic particles is 1.44 to 1.54.

8. The biaxially stretched optical film of claim 1, wherein the ultraviolet absorber is contained in an amount of 0.1 to 5 parts by weight based on 100 parts by weight of the acrylic resin.

9. The biaxially stretched optical film of claim 1, wherein the resin includes a polycarbonate, and the polycarbonate has a weight average molecular weight of 10,000 to 20,000 g/mol.

10. The biaxially stretched optical film of claim 1, wherein the resin includes a polycarbonate, and the polycarbonate is contained in an amount of 10% by weight or less based on total 100 parts by weight of the acrylic resin and the polycarbonate.

11. The biaxially stretched optical film of claim 1, further comprising a primer layer formed on one surface of the substrate layer.

12. The biaxially stretched optical film of claim 11, wherein the primer layer contains a polyester-based resin, a polyurethane-based resin, or a mixture thereof.

13. The biaxially stretched optical film of claim 1, wherein the magnification of the biaxial stretching is 1.2 times to 3.0 times in the MD direction and 1.5 times to 4.0 times in the TD direction.

14. The biaxially stretched optical film of claim 13, wherein the ratio of the stretching magnification in the MD direction to the stretching magnification in the TD direction (TD stretching magnification/MD stretching magnification) is 1.0 to 2.5.

15. The biaxially stretched optical film of claim 1, wherein the stretching temperature falls within a temperature range of −10° C. to +20° C. based on the glass transition temperature.

16. The biaxially stretched optical film of claim 1, wherein the biaxially stretched optical film has a transmittance at 380 nm of 20% or less under the condition that the optical film has a thickness of 40 μm.

17. The biaxially stretched optical film of claim 1, wherein the average roughness (Ra) of the surface of the biaxially stretched optical film is 4 nm to 30 nm.

18. The biaxially stretched optical film of claim 1, wherein the internal haze of the biaxially stretched optical film is 0.5% or less, and the external haze is 0.3% to 3.5%.

19. A polarizing plate comprising a polarizer; and the biaxially stretched optical film of claim 1 provided on one surface of the polarizer.

\* \* \* \* \*